(12) United States Patent
Ijima

(10) Patent No.: US 7,408,340 B2
(45) Date of Patent: Aug. 5, 2008

(54) VARIABLE RELUCTANCE TYPE ANGLE DETECTOR

(76) Inventor: Yasuo Ijima, 3-34-8, Shinsenriminami-machi, Toyonaka-shi, Osaka (JP) 560-0084

( * ) Notice: Subject to any disclaimer, the term of this patent is extended or adjusted under 35 U.S.C. 154(b) by 120 days.

(21) Appl. No.: 11/395,576

(22) Filed: Mar. 30, 2006

(65) Prior Publication Data

US 2006/0232270 A1 Oct. 19, 2006

(30) Foreign Application Priority Data

Apr. 13, 2005 (JP) ............... 2005-115635

(51) Int. Cl.
*G01B 7/30* (2006.01)
(52) U.S. Cl. ................................. 324/207.25
(58) Field of Classification Search ............ 324/207.15, 324/207.16, 207.17, 207.25; 336/135; 310/68 B, 310/168
See application file for complete search history.

(56) References Cited

U.S. PATENT DOCUMENTS 4,631,510 A * 12/1986 Nagarkatti et al. .......... 336/135

5,757,182 A 5/1998 Kitazawa

FOREIGN PATENT DOCUMENTS

JP 8-178611 7/1996

* cited by examiner

*Primary Examiner*—Reena Aurora
*Assistant Examiner*—Kenneth J Whittington
(74) *Attorney, Agent, or Firm*—Jordan and Hamburg LLP

(57) ABSTRACT

A variable reluctance type angle detector 1 is provided with a rotor 5 having such a shape that a gap permeance varies in a sine wave fashion with respect to an angle θ, the rotor 5 being provided rotatably on a stator 4 having teeth 2 on which an excitation wire 7, a SIN output wire 8, and a COS output wire 9 are wound. The number of the teeth 2 is twelve, and the stator 4 has the twelve teeth 2 sequentially disposed along a circumferential direction thereof. The excitation wire 7 is wound around the first, second, third, seventh, eighth, and ninth teeth 2 in a concentrated fashion to generate an identical polarity and wound around the fourth, fifth, sixth, tenth, eleventh, and twelfth teeth 2 in a concentrated fashion to generate a polarity which is reverse to the formerly mentioned polarity. The SIN output wire 8 is wound around the first, second, third, seventh, eighth, and ninth teeth 2 in a concentrated fashion to generate alternating polarities. The COS output wire 9 is wound around the fourth, fifth, sixth, tenth, eleventh, and twelfth teeth 2 in a concentrated fashion to generate alternating polarities.

1 Claim, 4 Drawing Sheets

VARIABLE RELUCTANCE TYPE ANGLE DETECTOR

BACKGROUND OF THE INVENTION

1. Field of the Invention

This invention relates to a variable reluctance type angle detector having a rotor having such a shape that a gap permeance varies in a sine wave fashion with respect to an angle θ, the rotor being provided rotatably on a stator having teeth on which an excitation wire and an output wire are wound.

2. Description of the Related Art

As a conventional variable reluctance type angle detector, one having a rotor rotatably provided at the center of a stator having an excitation wire and two-phase output wires are wound has been known. A stator core has twelve teeth disposed on a circumference and projecting inward.

The excitation wire is wound around the teeth in such a fashion that polarities of the adjacent teeth are different from each other to form excitation coils. The two-phase wires are wound around the teeth so as to achieve a SIN output and a COS output whose phases are different from each other by 90 degrees, thereby forming output coils. The rotor has such an outer shape that the gap permeance varies in a sine wave fashion with respect to an angle θ. When the rotor is rotated, an excitation voltage supplied to the excitation wire is outputted from one of the output wires as a COS output voltage, while a SIN voltage is outputted from the other output wire. Such variable reluctance type angle detector is disclosed in JP-A-8-178611.

FIG. 4 is a diagram schematically showing a wire structure of the excitation wire and the two-phase output wires wound around the twelve teeth. In FIG. 4, the teeth are denoted by numbers 1 to 12 sequentially along a circumferential direction for the convenience illustration. The excitation wire is wound around each of the odd number teeth while being negatively wound around each of the even number teeth. The numbers of windings of the positive winding and the negative winding are identical to each other.

As shown in FIG. 4, the output wire outputting the COS output voltage is wound positively and negatively in an alternate fashion along the circumferential direction. The numbers of the positive windings and the negative windings of this output wire are varied tooth by tooth in order to achieve the COS output. The output wire outputting the SIN output voltage is wound positively and negatively in an alternate fashion along the circumferential direction. The numbers of the positive windings and the negative windings of this output wire are varied tooth by tooth in order to achieve the SIN output.

In the conventional variable reluctance type angle detector, the three layers of the excitation wire and the two-phase output wires are wound around one tooth. Therefore, it is necessary to secure insulation at two interlayer parts in each of the teeth. In the conventional variable reluctance type angle detector, an insulating layer is not ordinarily used for the insulation of the interlayer parts, while an enamel layer formed on surfaces of the excitation wire and the two phase output wires secures the insulation. However, when the parts to be insulated are increased in number, probability of insulation failure due to stripping of the enamel layer or the like is increased.

In order to increase the output of the conventional variable reluctance type angle detector, the numbers of windings of the two-phase output wires are increased. Since the three layers of the excitation wire and the two-phase output wires are wound around one tooth, it is necessary to increase a capacity of a slot for the purpose of increasing the winding number. As a result, a problem of increase in size of the variable reluctance type angle detector occurs. Also, when the numbers of windings of each of the excitation wire and the two phase wires are increased in each of the teeth, the time required for winding work is increased, thereby undesirably causing an increase in cost.

SUMMARY OF THE INVENTION

This invention has been accomplished in view of the above-described circumstances. An object of this invention is to provide a variable reluctance type angle detector which is highly reliable in insulation and produces a high output with a simple structure and at a low cost.

Other objects and effects of this invention will become apparent from the following detailed description.

This invention provides a variable reluctance type angle detector comprising a rotor having such a shape that a gap permeance varies in a sine wave fashion with respect to an angle θ, the rotor being provided rotatably on a stator having teeth on which an excitation wire and output wires are wound, wherein the stator has the teeth, the number of the teeth being 12, and the first to twelfth teeth being provided along a circumferential direction of the stator; the excitation wire is wound around the first, second, third, seventh, eighth, and ninth teeth in a concentrated fashion to generate an identical polarity and wound around the fourth, fifth, sixth, tenth, eleventh, and twelfth teeth in a concentrated fashion to generate a polarity which is reverse to the formerly mentioned polarity; the first output wire is wound around the first, second, third, seventh, eighth, and ninth teeth in a concentrated fashion to generate alternating polarities; and the second output wire is wound around the fourth, fifth, sixth, tenth, eleventh, and twelfth teeth in a concentrated fashion to generate alternating polarities.

According to the variable reluctance type angle detector of this invention, it is possible to achieve a higher output than that of conventional angle detectors by winding each of the first output wire and the second output wire for the number of times same as that of the conventional angle detectors. Therefore, it is possible to realize a smaller size and high power variable reluctance type angle detector at a low cost. Also, due to the two-layer coil, which is formed by winding the excitation wire and the first output wire or the second output wire around each of the teeth, it is possible to reduce the number of insulation parts as compared to the conventional variable reluctance type angle detector in which the three-layer coil is formed, thereby improving reliability of the insulation.

DESCRIPTION OF THE PREFERRED EMBODIMENTS

Hereinafter, this invention will be described with reference to the drawings and based on preferred embodiments.

Figure 1:
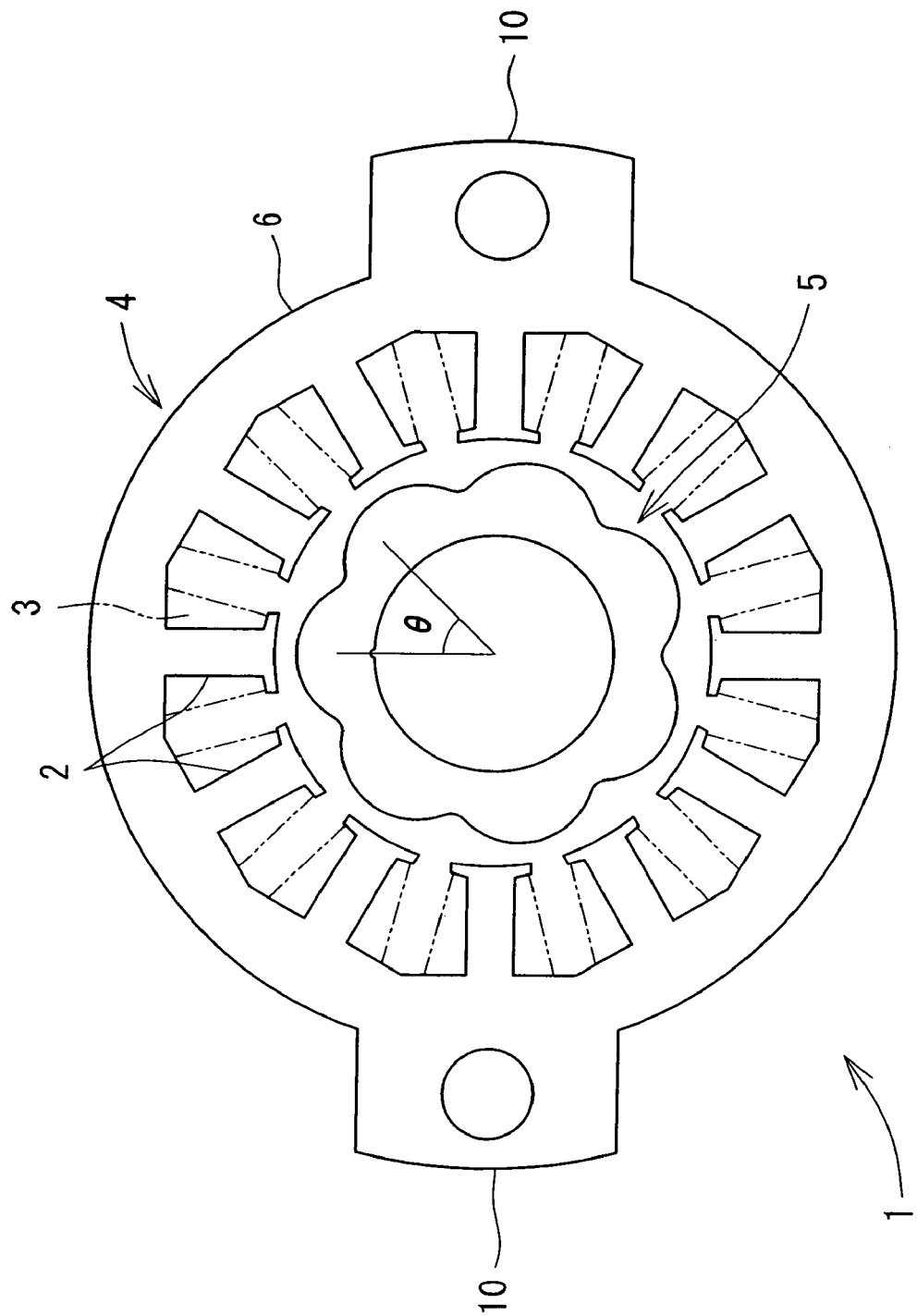
FIG. 1 is a plan view showing a major structure of a variable reluctance type angle detector 1 according to one embodiment of this invention.
Figure 2:
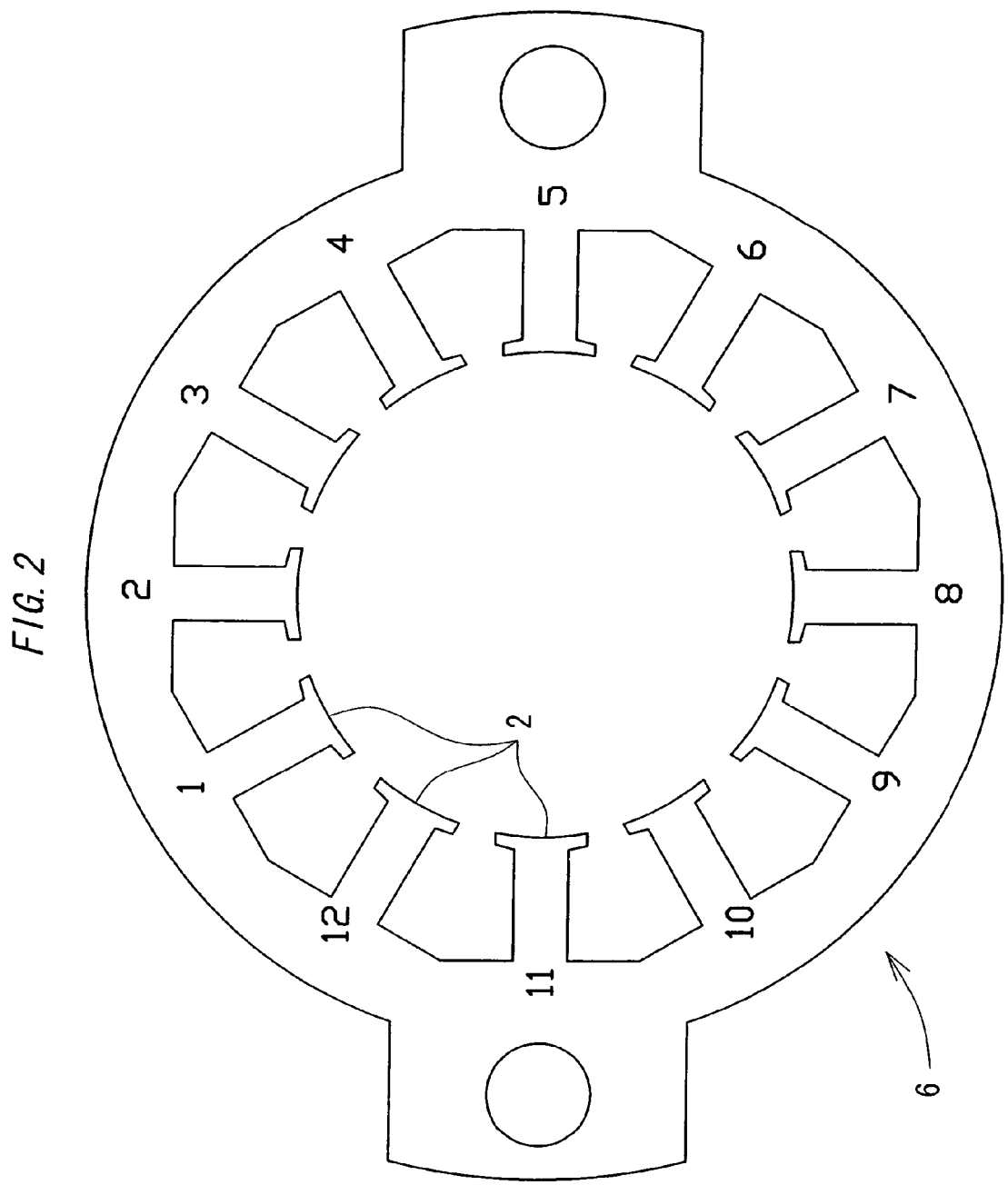
FIG. 2 is a schematic diagram showing one example of numbers given to twelve teeth.

FIG. 1 is a diagram showing a major structure of variable reluctance type angle detector 1 according to one embodiment of this invention. As shown in FIG. 1, the variable reluctance type angle detector 1 is provided with a stator 4 having twelve teeth 2 projected inward and disposed circumferentially and a coil 3 wound around each of the teeth 2 and a rotor 5 disposed rotatably at the center of the stator 4. The stator 4 has a stator core 6 on which an excitation wire 7, a SIN output wire 8 (first output wire), and a COS output wire 9 (second output wire) which form the coil 3 are wound by a predetermined winding method. An outer shape of the stator core 6 is substantially circular as shown in Figs. 1 and 2. The twelve teeth 2 are projected radially inward from an inner periphery of the stator core 6. The stator core 6 is obtainable by: pressing a steel plate having a predetermined thickness into the shape as shown in FIG. 1, which is the shape viewed from above; stacking a plurality of the steel plates; and fixing the steel plates to form the single member through caulking or the like, for example. The excitation wire 7, the SIN output wire 8, and the COS output wire 9 are wound around each of the twelve teeth 2 of the stator core 6 by a predetermined winding method. The coil 3 is formed of the excitation wire 7, the SIN output wire 8, and the COS output wire 9. Details of the winding methods of the excitation wire 7, the SIN output wire 8, and the COS output wire 9 will be described later in this specification. A flange 10 is formed on an outer periphery of the stator core 6 for the purpose of fixing the stator 4 at a desired position. The flange 10 may have an arbitrary structure.

As shown in FIG. 1, an outer shape of the rotor 5 is a substantially circular. An outer periphery of the rotor 5 has the shape capable of varying a gap permeance between the rotor 5 and the stator 4 in a sine wave fashion with respect to an angle θ of a direction of rotation of the rotor 5. Like the stator core 6, the rotor 5 is obtainable by: pressing a steel plate having a predetermined thickness into the shape as shown in FIG. 1, which is the shape viewed from above; stacking a plurality of the steel plates; and fixing the steel plates to form the single member through caulking or the like, for example. Though the rotor 5 of this embodiment is of a so-called axial double angle of 7X type, which has projections at seven points on the outer periphery, the axial double angle of the rotor of this invention is not particularly limited, and it is possible to arbitrarily select any one of 1X, 2X, 3X, 4X, and the like.

Hereinafter, the details of the methods of winding the excitation wire 7, the SIN output wire 8, and the COS output wire 9 around the teeth 2 of the stator core 6 will be described.

In FIG. 2, numbers 1 to 12 are given to the twelve teeth 2 of the stator core 6 along a clockwise direction. Any one of the teeth 2 may be numbered by 1 (first teeth), and the tooth to be numbered by 2 (second teeth) may be either one of the adjacent teeth in the clockwise direction or an anticlockwise direction insofar as the second teeth is adjacent to the first teeth and the numbering is in the ascending order. In this embodiment, the numbering is sequential and in the ascending order along the clockwise direction as shown in FIG. 2.

Figure 3:
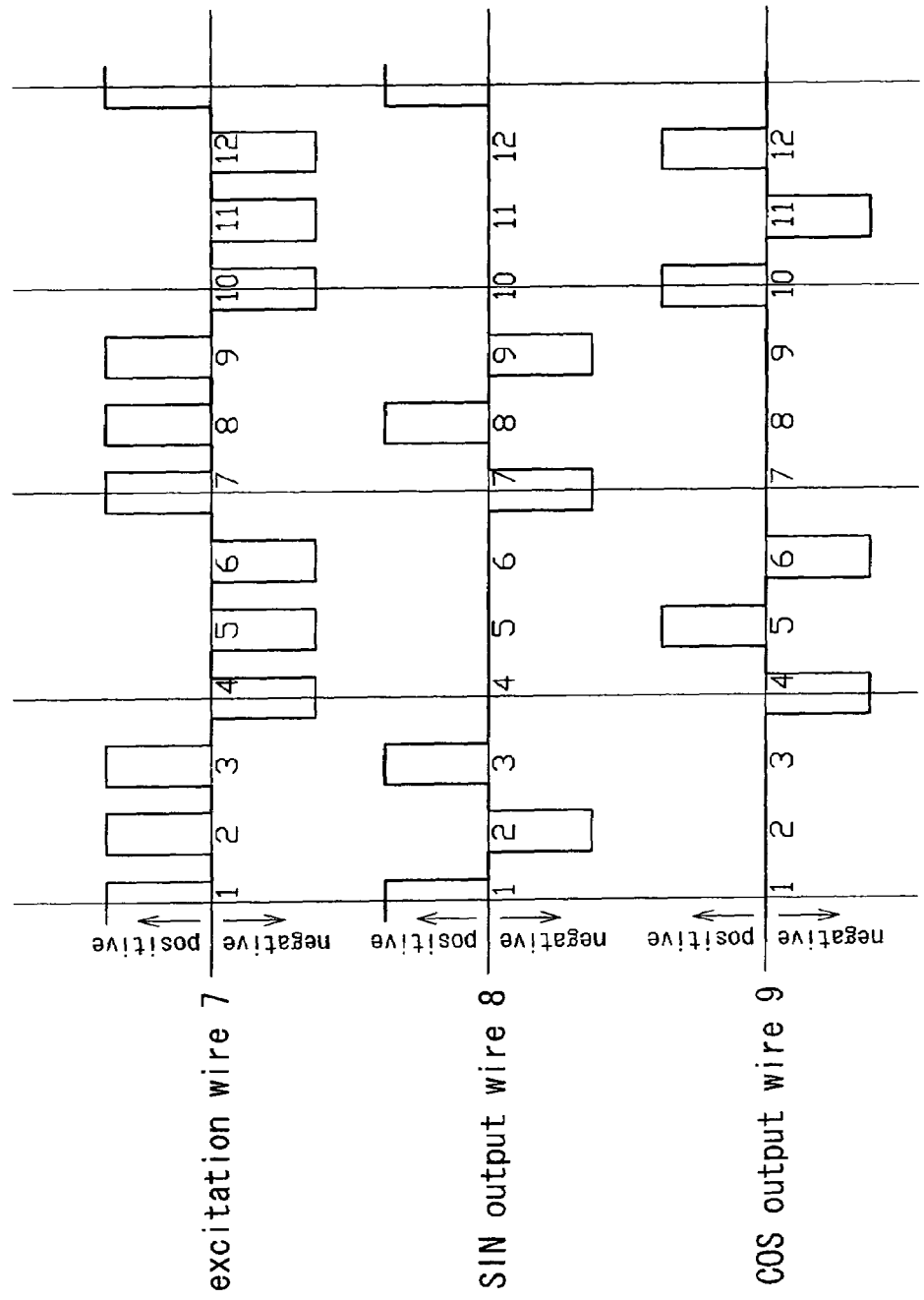
FIG. 3 is a schematic diagram for illustrating a method of winding an excitation wire 7, a SIN output wire 8, and a COS output wire 9.
Figure 4:
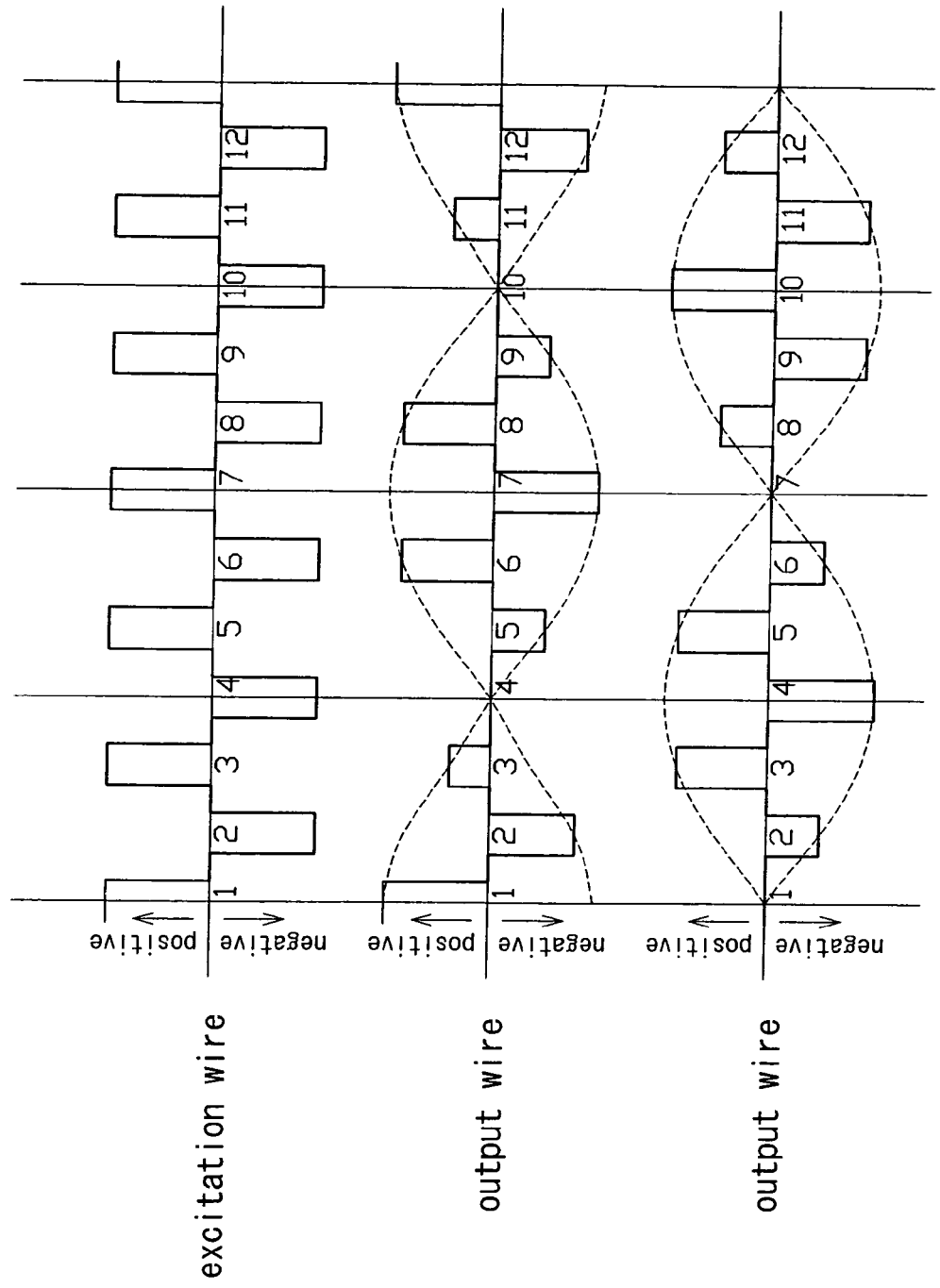
FIG. 4 is a schematic diagram for illustrating a method of winding an excitation wire and output wires of a conventional variable reluctance type angle detector.

As shown in FIG. 3, the excitation wire 7 is wound around each of the first, second, third, seventh, eighth, and ninth teeth 2 by a predetermined number of turnings (number of windings) in a concentrated fashion to generate an identical polarity and wound around each of the fourth, fifth, sixth, tenth, eleventh, and twelfth teeth 2 by a predetermined number of turnings in a concentrated fashion to generate a polarity reverse to that of the first, second, third, seventh, eighth, and ninth teeth 2. More specifically, when the excitation wire 7 is positively wound around each of the first, second, third, seventh, eighth, and ninth teeth 2, the excitation wire 7 is negatively wound around each of the fourth, fifth, sixth, tenth, eleventh, and twelfth teeth 2.

By thus winding the excitation wire 7: the excitation wire 7 is identical in polarity in the first, second, third, seventh, eighth, and ninth teeth 2; the excitation wire 7 is identical in polarity in the fourth, fifth, sixth, tenth, eleventh, and twelfth teeth 2; and the polarity of the first, second, third, seventh, eighth, and ninth teeth 2 is reverse to that of the fourth, fifth, sixth, tenth, eleventh, and twelfth teeth 2.

Note that the winding method of the excitation wire 7 is not particularly limited, and it is possible to use a flyer type or nozzle type winding machine for winding one copper wire continuously to the teeth 2 with a linking portion between the adjacent teeth being twined around a twining member formed on the stator core 6, thereby effectively winding the excitation wire 7 around the teeth 2 in the concentrated fashion. Also, it is possible to arbitrarily decide either one of the group of the first, second, third, seventh, eighth, and ninth teeth 2 and the group of the fourth, fifth, sixth, tenth, eleventh, and twelfth teeth 2 as the teeth group for winding thereon the excitation wire 7 positively or negatively.

As shown in FIG. 3, the SIN output wire 8 is wound around each of the first, second, third, seventh, eighth, and ninth teeth 2 by a predetermined number of turnings in such a fashion that polarities of the adjacent teeth 2 are reverse to each other. More specifically, when the SIN output wire 8 is wound around the first, third, and eighth teeth 2 positively, the SIN output wire 8 is wound around the second, seventh, and ninth teeth 2 negatively.

By thus winding the SIN output wire 8: the SIN output wire 8 wound around the first, third, and eighth teeth 2 is identical in polarity; the SIN output ware 8 wound around the second, seventh, and ninth teeth 2 is identical in polarity; and the polarity of the first, third, and eighth teeth 2 is reverse to that of the second, seventh, and ninth teeth 2. In other words, the polarities of the SIN output wire 8 are alternated in the first, second, third, seventh, eighth, and ninth teeth 2.

As shown in FIG. 3, the COS output wire 9 is wound around each of the fourth, fifth, sixth, tenth, eleventh, and twelfth teeth 2 by a predetermined number of turnings in such a fashion that polarities of the adjacent teeth 2 are reverse to each other. More specifically, when the COS output wire 9 is wound around the fourth, sixth, and eleventh teeth 2 positively, the COS output wire 9 is wound around the fifth, tenth, and twelfth teeth 2 negatively.

By thus winding the COS output wire 9: the COS output wire 9 wound around the fourth, sixth, eleventh teeth 2 is identical in polarity; the COS output wire 9 wound around the fifth, tenth, and twelfth teeth 2 is identical in polarity; and the polarity of the fourth, sixth, and eleventh teeth 2 is reverse to that of the fifth, tent, and twelfth teeth 2. In other words, the polarities of the COS output wire 9 are alternated in the fourth, fifth, sixth, tenth, eleventh, and twelfth teeth 2.

Thus, a phase between the SIN output wire 8 and the COS output wire 9 is 90° difference. Therefore, when a voltage is input to the excitation wire 7, a SIN output voltage is obtained from the SIN output wire 8, and a COS output voltage is obtained form the COS output wire 9.

Though the winding methods of the SIN output wire 8 and the COS output wire 9 are not particularly limited, it is possible to use a flyer type or nozzle type winding machine for winding one copper wire continuously to the teeth 2 with a linking portion between the adjacent teeth being twined around a twining member formed on the stator core 6, as is the case with the excitation wire 7, thereby effectively winding the SIN output wire 8 and the COS output wire 9 around the teeth 2 in the concentrated fashion.

Thus, it is possible to obtain an output higher than that of the conventional example by the variable reluctance type angle detector 1 according to this embodiment wherein each of the SIN output wire 8 and the COS output wire 9 is wound around on the teeth 2 by the number of turnings which is similar to the conventional example. By thus reducing the number of turnings, it is possible to use the stator core 6 having a smaller slot capacity, thereby realizing a reduction in size of the variable reluctance type angle detector 1. Since the number of turnings of each of the SIN output wire 8 and the COS output wire 9 is reduced, it is possible to reduce the time required for winding work, thereby realizing a reduction in cost for the variable reluctance type angle detector 1. With the reduced number of turnings of each of the SIN output wire 8 and the COS output wire 9 in each of the teeth 2, it is possible to readily adjust the number of turnings of each of the SIN output wire 8 and the COS output wire 9 for the purpose of correcting an error in output accuracy due to influences of processing error of the rotor 5 and the like.

The SIN output wire 8 and the COS output wire 9 are wound around the teeth 2 at positions different by 180°, i.e. at the opposite teeth 2 of the stator core 6. In the case where decentering is caused due to the possessing error of the rotor 5 and the like, an induced voltage generated on the SIN output wire 8 or the COS output wire 9 is cancelled by the SIN output wire 8 or the COS output wire wound around the opposite tooth 2. Thus, this invention has an advantage that a balance between the output voltages of the SIN output wire 8 and the COS output wire 9 is maintained.

The excitation wire 7 and either the first output wire 8 or the second output wire 9 are wound around each of the teeth 2. That is, the coil 3 has a two-layer structure in each of the teeth 2. Therefore, reliability of insulation is improved since the number of interlayer parts which require insulation is reduced as compared to the conventional coil having a three-layer structure in each of teeth. Also, due to the two-layer coils 3, the total number of the coils for the twelve teeth are 24, which is smaller than the number of total coils required when using the conventional three-layer coil, thereby reducing the time required for winding work. Thus, the reduction in cost for the variable reluctance type angle detector 1 is realized.

Hereinafter, examples of this invention will be described.

As Example 1, a variable reluctance type angle detector 1 having the same constitution as the above-described embodiment was manufactured. So, the SIN output wire 8 was wound around the coils of the first, second, third, seventh, eighth, and ninth teeth 2. A projection of the rotor 5 was positioned opposed to the second tooth 2. Voltages (O-P) generated by the coils of the first, second, third, seventh, eighth, and ninth teeth 2 when a voltage of 10 V (O-P) was inputted to the excitation coils 7 were measured.

As Example 2, the rotor 5 of the variable reluctance type angle detector 1 was changed from the 7X type to 1X type. So, the SIN output wire 8 was wound around the coils of the first, second, third, seventh, eighth, and ninth teeth 2. The rotor 5 was positioned opposed to the second tooth 2. Voltages (O-P) generated by the coils of the first, second, third, seventh, eighth, and ninth teeth 2 when a voltage of 10 V (O-P) was inputted to the excitation coils 7 were measured in the same manner as in Example 1.

As Comparative Example 1, a variable reluctance type angle detector wherein an excitation wire 7 was wound around each of first to twelfth teeth 2 in such a fashion as to alternate polarities, and a SIN output wire 8 and a COS output wire 9 were wound in the same manner as in the above-described embodiment was manufactured. A projection of rotor 5 of 7X type was positioned opposed to the second tooth 2, and voltages (O-P) generated by the coils of the first, second, third, seventh, eighth, and ninth teeth 2, on which the SIN output wire 8 was wound, when a voltage of 10 V (O-P) was inputted to the excitation coils 7 were measured.

As Comparative Example 2, the rotor 5 of Comparative Example 1 was changed from the 7X type to 1X type. So, the SIN output wire 8 was wound around the coils of the first, second, third, seventh, eighth, and ninth teeth 2. A projection of rotor 5 of 1X type was positioned opposed to the second tooth 2. Voltages (O-P) generated by the coils of the first, second, third, seventh, eighth, and ninth teeth 2 when a voltage of 10 V (O-P) was inputted to the excitation coils 7 were measured in the same manner as in Example 1.

Results are shown in Table 1.

TABLE 1

| | Voltages generated by coils of teeth 2 on which SIN output wire 8 was wound | | | |
|---|---|---|---|---|
| Voltage Generated by Coil V (O-P) | Example 1 | Example 2 | Comparative Example 1 | Comparative Example 2 |
| First | +2.55 | +2.6 | +1.63 | +1.5 |
| Second | −2.85 | −3.2 | −6.4 | −7.1 |
| Third | +2.55 | +2.6 | +1.63 | +1.5 |
| Seventh | −3.5 | −3.2 | −1.38 | −1.44 |
| Eighth | +1.85 | +2.55 | +3.6 | +5.83 |
| Ninth | −3.5 | −3.2 | −1.38 | −1.44 |
| Total Output Voltage | −2.9 | −1.85 | −2.3 | −1.15 |

As shown in Table 1, in the comparison between the voltages generated by the coils of the teeth 2 of Example 1 and Comparative Example 1 in both of which the rotor of 7X type was used, the total output voltage of Example 1 is higher than that of Comparative Example 1 though a higher output is achieved by a part of coils of Comparative Example 1 as compared to the corresponding coils of Example 1. In the comparison between Example 2 and Comparative Example 2 in each of which the rotor of 1X type was used, the total output voltage of Example 2 is higher than that of Comparative Example 2 though a higher output is achieved by a part of coils of Comparative Example 2 as compared to the corresponding coils of Example 2. As the total output voltage, negatively larger values were obtained by Examples 1 and 2 as compared to Comparative Examples 1 and 2; however, whether the total output voltage is negative or positive is a question of relativity, and it is considered that the output value is higher when the absolute value of the sum of the generated voltages of the 6 coils is larger.

It is needless to say that it is possible to make many other modifications of this invention. Therefore, the foregoing embodiments and examples are described for the purpose of illustration and not for the purpose of limitation. Modifications existing in the spirit and scope of this invention are encompassed by this invention.

What is claimed is:

1. A variable reluctance type angle detectors, comprising:

a stator including teeth, a number of the teeth being twelve, and a first one of the teeth to a twelfth one of the teeth being provided sequentially in numerical order along a circumferential direction of the stator;

a rotor which is rotatable relative to the stator, said rotor having a shape such that a gap permeance varies in a sine wave fashion with respect to an angle;

an excitation wire being wound around a first group of said teeth including the first, second, third, seventh, eighth, and ninth ones of the teeth in a concentrated fashion to generate a first polarity identical for all of said first group of teeth, and wound around a second group of teeth including the fourth, fifth, sixth, tenth, eleventh, and twelfth ones of said teeth in a concentrated fashion to generate a second polarity which is reverse to the first polarity;

a first output wire being wound around the first, second, third, seventh, eighth, and ninth ones of the teeth in a concentrated fashion to generate alternating polarities; and a second output wire being wound around the fourth, fifth, sixth, tenth, eleventh, and twelfth ones of the teeth in a concentrated fashion to generate alternating polarities.

* * * * *